United States Patent [19]
Bivens

[11] 3,840,931
[45] Oct. 15, 1974

[54] DRIVE THROUGH CAR WASH WITH DOUBLE PIVOTED SPRING CONNECTED SIDE BRUSH ARRANGEMENT

[75] Inventor: David J. Bivens, Danville, Va.

[73] Assignee: Bivens Winchester Corporation, Ann Arbor, Mich.

[22] Filed: Sept. 26, 1973

[21] Appl. No.: 400,787

[52] U.S. Cl. ............................ 15/21 D, 15/DIG. 2
[51] Int. Cl. ............................................. B60s 3/06
[58] Field of Search ............ 15/DIG. 2, 21 D, 21 E, 15/53

[56] References Cited
UNITED STATES PATENTS
3,522,619   8/1970   Weigele et al. ..................... 15/21 D
FOREIGN PATENTS OR APPLICATIONS
1,243,230   8/1971   Great Britain .................. 15/DIG. 2

Primary Examiner—Edward L. Roberts
Attorney, Agent, or Firm—Thomas N. Young

[57] ABSTRACT

Vehicle washing apparatus including a pair of wrap-around side brushes pivotally mounted on overhead pivotal support arms which extend across a vehicle wash lane through which a vehicle is caused to progress. The brush pivot arms are interconnected by means of a tension spring and further are resiliently urged toward one side of the wash lane by means of a counterweight and cable assembly. As the vehicle engages the brushes, progress of the vehicle through the wash lane causes the brushes to separate while the vehicle passes therebetween and to remerge across the rear of the vehicle, thus, to wash front, sides, and rear of the vehicle in one pass. The mechanical biasing arrangement completely eliminates any need for electromechanical hydraulic or pneumatic control devices.

8 Claims, 5 Drawing Figures

PATENTED OCT 15 1974

DRIVE THROUGH CAR WASH WITH DOUBLE PIVOTED SPRING CONNECTED SIDE BRUSH ARRANGEMENT

INTRODUCTION

This invention relates to vehicle washing apparatus and more particularly to a control arrangement for a pair of so called "wraparound" side brushes for causing such brushes to follow a controlled path of displacement around the opposite sides of a vehicle to completely clean the front, side, and rear surfaces of the vehicle.

BACKGROUND OF THE INVENTION

There are a large number of automatic and semiautomatic car wash systems now known in the art. Most of such systems include control means for controlling the displacement of brushes which scrub the vertical surfaces of a vehicle passing along or through a wash lane. To perform an adequate scrubbing function on the front and rear surfaces as well as the sides of the vehicle, the side brushes must ordinarily be carefully controlled to follow the vehicle and to move laterally relative to the vehicle. Typically, the control arrangements for such brushes include complicated folding pivot arms, hydraulic or air cylinders, and electronics components which are responsive to the presence of the vehicle to control the relative position of the side brush. The presence of proximity detectors and electronic control systems, of course, contributes substantially to the initial cost and maintenance complexity of the car washing apparatus and, in addition, is subject to failure during use. All of these factors tend to make such a car washing apparatus undesirable from the economic standpoint since initial cost, high maintenance cost, and high downtime all detract from the profitability of a car washing business utilizing such apparatus.

BRIEF SUMMARY OF THE INVENTION

The present invention provides a car washing apparatus having a pair of wraparound-type side brushes which are operated in such a fashion as to completely clean the vertical surfaces of the vehicle including the sides, front, and rear in an extremely effective fashion and, moreover, to provide such a function using a purely mechanical arrangement of extreme simplicity, and eliminating the need for vehicle proximity sensor and other electronic, pneumatic, and hydraulic control devices.

In general, the objects of the present invention are realized by way of an apparatus including a pair of vehicle washing brushes having vertical or substantially vertical axes disposed in a wash lane and mounted for pivotal displacement across the wash lane. Means are provided for resiliently interconnecting the two brushes so as to provide a resilient force opposing the separation of the brushes but permitting sufficient separation to enable a vehicle to pass between the brushes. In addition, means are provided for resiliently urging the brush pair in parallel adjacent fashion toward one side of the wash lane in such a position as to encounter a "corner" of the vehicle as it apparoaches the brushes; i.e., one brush initially engages the side surface of the vehicle and the other brush initially engages the front surface of the vehicle, the two points of engagement being substantially at the convergence of the front and side planes of the vehicle. Further forward displacement of the vehicle relative to the brush set drives one of the brushes across the front of the vehicle, while the other brush moves down a side of the vehicle, the brushes resiliently separating to permit the vehicle to pass therebetween. Once the vehicle has passed fully between the brushes, the resilient spring force tends to drive the brushes together causing the brush to merge across the back of the vehicle, cleaning the rear surface as the merging takes place. Finally, the brushes move back toward the initial rest position, adjacent one side of the wash lane ready for the next vehicle passing through the wash lane. All of such controlled displacement is accomplished without any need for electronic control devices and without complicated double-pivot arrangements as characterizes a great deal of the prior art.

Various additional features and advantages of the invention will become apparent upon reading the following specification.

DETAILED DESCRIPTION OF THE SPECIFIC EMBODIMENT

Figure 1:
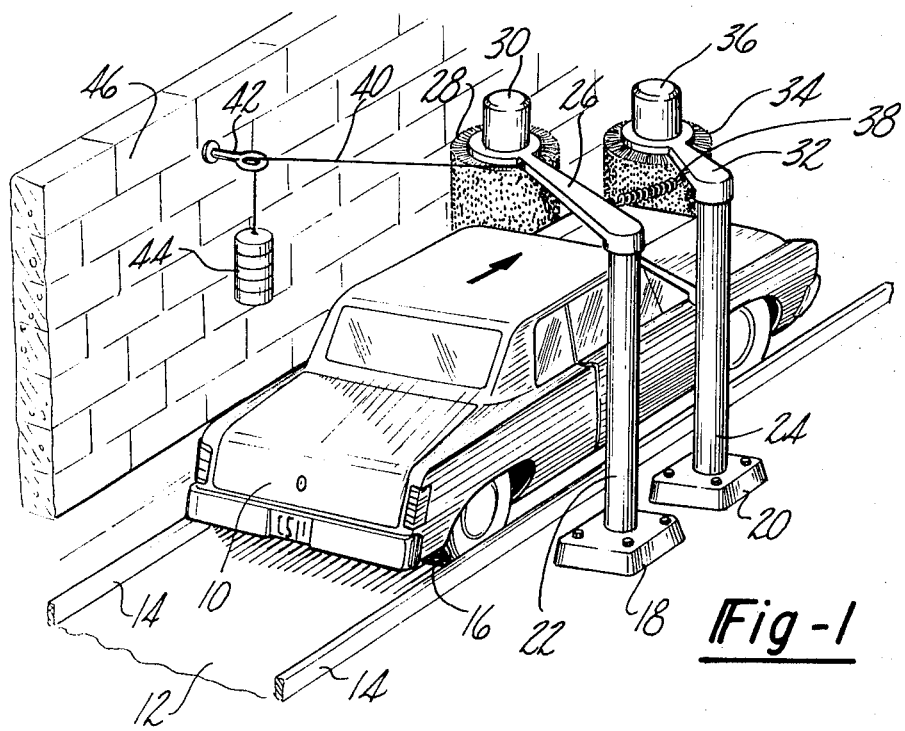
FIG. 1 is a perspective view of a preferred embodiment of the invention illustrating an automobile passing along a wash lane in which a brush set constructed in accordance with the invention is mounted.

Looking now to FIG. 1, the illustrative embodiment of the invention is shown operating on a passenger vehicle 10 progressing through a wash lane 12 defined by guide rails 14 mounted on a rigid floor. Vehicle 10 is propelled through the wash lane 12 at a relatively slow, steady rate by means of a conventional push roller 16 which engages a rear wheel of the vehicle 10. It is to be understood that the wash lane itself, as illustrated in FIG. 1, is entirely conventional and a variety of equivalent wash lane structures, guide structures, and vehicle displacement devices may be substituted for those schematically illustrated in the drawings. It will also be understood that the system of FIG. 1 comprises water dispensing and draining means, drying means, and other devices, all of which are ancillary to the present invention and omitted from the specification for brevity.

Disposed adjacent one side of the wash lane are mounting plates 18 and 20 which rigidly and securely support a pair of brush support posts 22 and 24, respectively. The support posts 22 and 24 have substantially parallel vertical axes and are spaced apart by a distance of approximately 18 inches along the wash lane 12. Post 22 supports at the upper end thereof a rigid substantially horizontal pivot arm 26 which extends across the wash lane 12 and carries at the free end thereof a side brush 28 which is adapted to be driven in a clockwise direction by a motor 30. Brush 28 may be of the limp plastic bristle type well known in the art and widely used in car washing systems. The axis of rotation of brush 28 is substantially vertical and the length of the pivot arm 26 is approximately 8 feet, sufficient to permit the brush 28 to reside in a position on the opposite side of the wash lane 12 from the support post 22.

Similarly, support post 24 carries at the upper end thereof a rigid and substantially horizontal pivot arm 32 of approximately 7½ feet in length extending across the wash lane 12 and carrying on the free end a brush 34 having the axis of rotation substantially parallel to but spaced from the axis of brush 28. Brush 34 is rotatively driven by a motor 36 in the clockwise direction. The height of the posts 22 and 24 is such that vehicle 10 may pass under arms 26 and 32.

Figure 2:
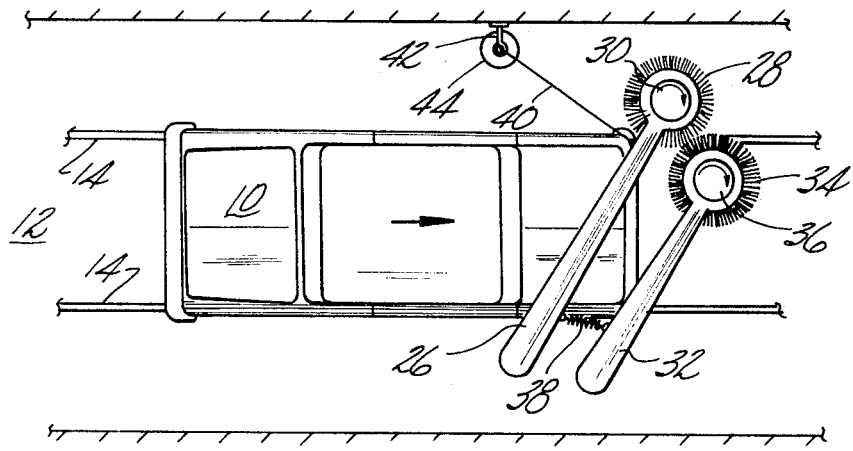
FIG. 2 is a simplified plan view of a vehicle making initial contact with the brush set.
Figure 4:
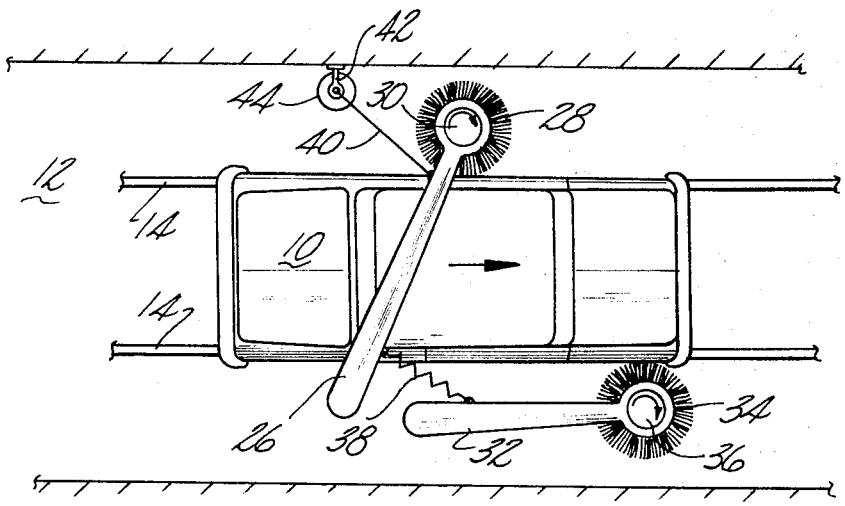
FIG. 4 is a simplified plan view of the vehicle in a still further point of progress through the wash cycle; and, FIG. 5 is a simplified plan view of the vehicle in a still further point of progress; i.e., at the point at which the vehicle departs from contact with the scrubbing brushes.
Figure 5:
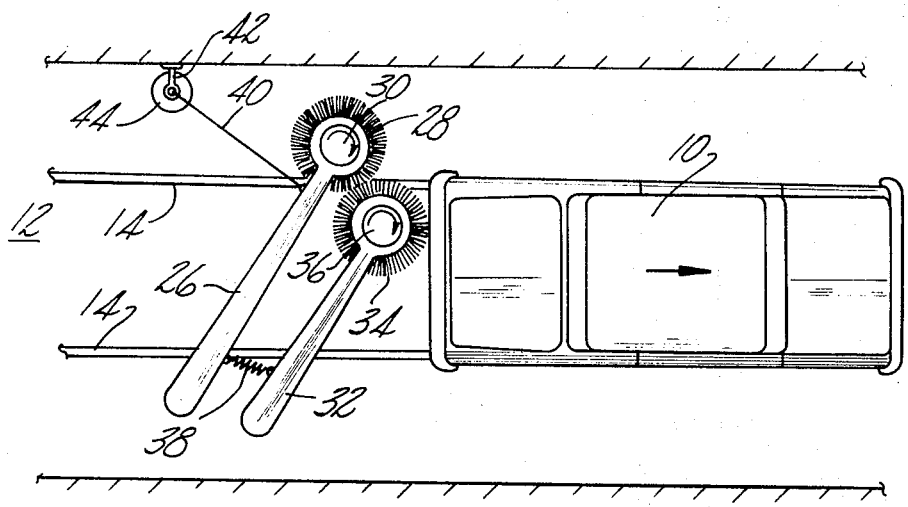

Pivot arms 26 and 32 are resiliently interconnected by means of a coil spring 38, the points of connection being approximately eighteen inches from the pivot points represented by the vertical centerlines of the posts 22 and 24. The coil spring 38 provides a resilient force tending to resist separation of the brushes 28 and 34, such separation occuring as a vehicle 10 passes between the brushes during a normal washing cycle as hereinafter described with reference to FIGS. 2 through 5. Coil spring 38 is, thus, mainly a tension spring but also operates as a mechanical stop to limit the proximity of the brushes to a slight bristle meshing condition as best illustrated in FIGS. 2 and 5, this being the normal or rest position of the brushes 28 and 34.

The spring interconnected brush pivot arms 28 and 32 are also resiliently biased toward the side of the wash lane 12 opposite the support post 22 and 24. This is accomplished by means of a cable 40 which is connected to the pivot arm 26 adjacent the free end and threaded through a turnbuckle 42 so as to carry a plurality of counterweights 44. Turnbuckle 42 is conveniently mounted on a wall 46 of the wash lane, the counterweights 44 being effective to draw the combination of the brushes to the side of the wash lane opposite the standards 22 and 24 to define the rest position. Mechanical stops of a type well known to those skilled in the art may be provided in the pivot assemblies for the pivot arms 26 and 32 so as to limit the travel toward wall 46 to the position shown in FIGS. 2 and 5. The weights 44 are selected to be overridden by the force of spring 38 when the spring is fully extended.

OPERATION

In operation, a vehicle 10 is driven through the wash lane 12 by the push roller 16 until the front left corner of the vehicle 10 first contacts the brushes 28 and 34. The initial or rest position of the brushes 28 and 34 is such that the brush 28 contacts the left side surface of the vehicle 10, as seen in FIGS. 2 through 5, and is in a position to pass along the left side surface of the vehicle. On the other hand, the brush 34 being normally disposed more centrally in the wash lane 12 engages the front surface of the vehicle 10 at the front left corner. There is substantially no area of the vehicle which is not contacted by the limp bristle brushes due to the slight interfering or meshing relationship therebetween.

Figure 3:
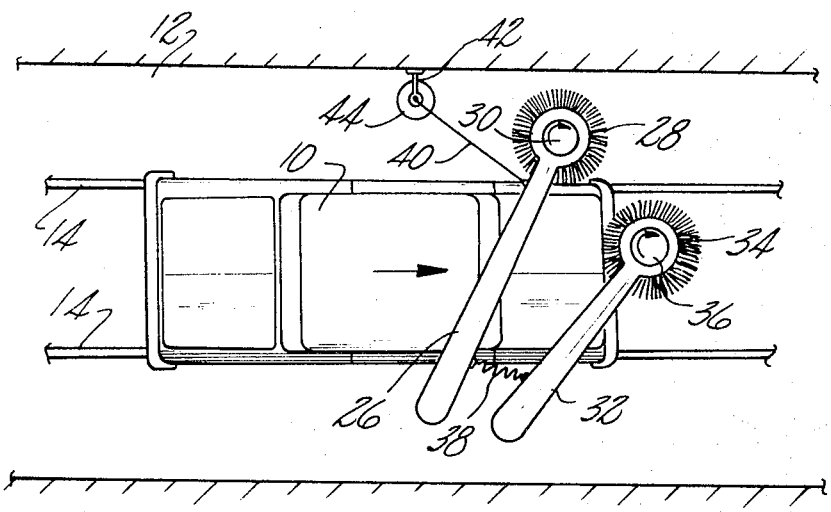
FIG. 3 is a simplified plan view of the vehicle at a further point of progress through the wash cycle.

As shown in FIG. 3, the further forward motion of the vehicle 10 through the wash lane in the direction of the arrow causes the pivot arm 32 carrying the brush 34 to swing or pivot in the clockwise direction to follow the vehicle 10 forwardly in the wash lane 12, this forward motion being accompanied by a lateral motion from left to right across the front of the vehicle as seen in FIG. 3. Brush arm 26, however, remains substantially in the initial or rest position. Spring 38 is, thus, tensioned as the arms 26 and 32 separate. The result is that the brush 28 scrubs the left side surface of the vehicle 10 while the brush 34 scrubs the entire front vertical surface of the vehicle 10. As shown in FIG. 4, further forward progress of vehicle 10 ultimately causes the clockwise rotating brush 34 to extend fully to and around the right front corner of the vehicle 10 and to begin scrubbing the right side surface of the vehicle. At this point, the coil spring 38 is fully extended and the pivot arms 26 and 32 describe the largest possible included angle. Brushes 28 and 34 are held against the sides of the vehicle by the resilient force of the spring 38.

Looking now to FIG. 5, the further forward progress of vehicle 10 ultimately brings the left side brush 28 to the left rear corner of the vehicle where still further progress of the vehicle permits brush 28 to begin to pass across the rear surface of the vehicle from left to right, the force of the spring 38 being such as to maintain brush 28 in full contact with the rear of the vehicle while at the same time pulling it toward the right side of the vehicle; i.e., toward brush 34. Under these conditions, brush 34 is still in contact with the right side surface of the vehicle 10 and is maintained in such position until the vehicle moves forwardly enough that the brush reaches and rounds the right rear corner of vehicle 10. As this occurs, the spring force 32 draws the two brushes together, across the rear of the vehicle, performing a second scrubbing operation for thoroughness, and returns the brushes 28 and 34 to the initial rest position ready for a second or subsequent vehicle.

From the foregoing it can be seen that by virtue of the apparatus of the present invention the two brushes 28 and 34 are effective to scrub all of the vertical surfaces of the vehicle, both front, rear, and sides, the resilient forces provided by spring 38 and counterweights 44 being such as to initially urge the brushes to a rest position adjacent the left side of the washing lane, permit brush 34 to move across the front of the vehicle while separating from the brush 28, permit brush 28 to move across the rear of the vehicle under the force of the extended spring 38, and to return to the rest position. The vehicle 10 passes fully between the brushes to separate the arms 26 and 32 and to tension spring 38. The pivot arms effect a programmed displacement wherein brush 34 moves laterally across the front of the vehicle while brush 28 is held against the left side surface, and brush 28 moves laterally across the rear of the vehicle while brush 34 is held against the right side of the vehicle. Virtually no electrical or hydraulic or pneumatic control system is required for this programming and, accordingly, both efficient operation and minimal cost and maintenance are provided.

It is to be understood that various modifications to the structure illustrated in the preferred embodiment are possible. Spring 38 may take a variety of forms. Furthermore, the counterweight and cable arrangement 44, 40 may be replaced with a variety of other resilient biasing arrangements. It is, therefore, to be understood that the foregoing description is not to be construed in a limiting sense.

The embodiments of the invention in which an exclusive property or privilege is claimed are defined as follows:

1. Vehicle washing apparatus of the type for washing the vertical surfaces of a vehicle in a wash lane comprising: a first substantially vertical brush pivotally mounted in the wash lane for displacement across the lane, a second substantially vertical brush pivotally mounted in the wash lane and normally closed adjacent the first brush for displacement across the lane, first biasing means resiliently urging the brushes toward one another, second biasing means resiliently urging the brushes toward a rest position on one side of the wash lane where the first brush engages a side surface of a vehicle in the wash lane and approaching the brushes and the second brush engages the front surface of the vehicle, and means for producing relative displacement between the vehicle and the brushes to cause the vehicle to separate and pass between said brushes.

2. Vehicle washing apparatus as defined in claim 1 wherein the first brush further comprises a first pivot arm extending over and across the wash lane for providing angular pivotal displacement of the brush, the second brush further includes a second pivot arm extending over and across the wash lane and supporting the second brush in parallel spaced relationship to the first brush, and means for producing rotation of the brushes.

3. Vehicle washing apparatus as defined in claim 2 wherein the first pivot arm is longer than the second pivot arm.

4. Vehicle washing apparatus as defined in claim 2 wherein the first biasing means comprises a spring connected between said pivot arms.

5. Vehicle washing apparatus as defined in claim 2 wherein said second biasing means comprises means for resiliently urging the brushes to a closely spaced position which is substantially on the opposite side of the wash lane as the pivot axes of the pivot arms.

6. Vehicle washing apparatus as defined in claim 5 wherein the second biasing means comprises a counterweight.

7. Apparatus as defined in claim 1 wherein said means for producing comprises means engaging the vehicle for displacing the vehicle along the wash lane.

8. Vehicle washing apparatus as defined in claim 1 wherein said first brush further comprises a substantially horizontally disposed overhead pivot arm having a pivot axis adjacent one side of the wash lane, said second brush comprises a second substantially horizontal overhead pivot arm having a pivot axis on the same side of the wash lane as the pivot axis for the first pivot arm, but spaced along said wash lane in the direction of vehicle progress therethrough, said first pivot arm being longer than said second pivot arm and said second biasing means being such as to urge the brushes toward a rest position which is opposite the side of the wash lane as the pivot arm axes, the resilient urging force provided by said first biasing means being greater than the force provided by said first biasing means whenever said brushes are fully separated from one another by the presence of a vehicle therebetween.

* * * * *